US010955962B2

(12) United States Patent
Chen et al.

(10) Patent No.: US 10,955,962 B2
(45) Date of Patent: Mar. 23, 2021

(54) ELECTRONIC DEVICE AND CONTROL METHOD THEREOF THAT SWITCHES A TOUCH PANEL BETWEEN AN INDEPENDENT MODE AND A DUAL INPUT MODE

(71) Applicant: ASUSTEK COMPUTER INC., Taipei (TW)

(72) Inventors: Ya-Ting Chen, Taipei (TW); Hung-Yi Lin, Taipei (TW); Yao-Yu Tsai, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/404,421

(22) Filed: May 6, 2019

(65) Prior Publication Data

US 2020/0150817 A1 May 14, 2020

(30) Foreign Application Priority Data

Nov. 9, 2018 (TW) ................................. 107139901

(51) Int. Cl.
*G06F 3/041* (2006.01)
*G06F 3/0488* (2013.01)
(52) U.S. Cl.
CPC ........ *G06F 3/0416* (2013.01); *G06F 3/04883* (2013.01)
(58) Field of Classification Search
None
See application file for complete search history.

(56) References Cited

U.S. PATENT DOCUMENTS

| 8,564,544 | B2 | 10/2013 | Jobs et al. | |
| 2017/0160924 | A1* | 6/2017 | Xie | G06F 3/04886 |
| 2018/0032247 | A1* | 2/2018 | Itoh | G06F 3/0233 |
| 2019/0369870 | A1* | 12/2019 | Marsden | G06F 3/04883 |

FOREIGN PATENT DOCUMENTS

| CN | 103076968 A | 5/2013 |
| CN | 103913617 A | 7/2014 |
| CN | 105511781 A | 4/2016 |
| TW | 201537413 A | 10/2015 |
| TW | 201606335 A | 5/2016 |

* cited by examiner

*Primary Examiner* — Kirk W Hermann
(74) *Attorney, Agent, or Firm* — Muncy, Geissler, Olds & Lowe, P.C.

(57) ABSTRACT

An electronic device includes a touch panel with a touch area and a command button and includes an independent input mode and a dual input mode. In addition, a control method of an electronic device includes steps of: receiving touch data; determining whether the dual input mode needs to be executed or not, according to the touch data, executing the dual input mode when the dual input mode is determined to be executed, and executing the independent input mode when the dual input mode is not determined to be executed; and determining whether the touch panel is operated within a preset time or not, after executing the dual input mode, considering the touch data as a gesture input when the touch panel is determined as being used within a preset time, and switching to the independent input mode if not.

10 Claims, 5 Drawing Sheets

ELECTRONIC DEVICE AND CONTROL METHOD THEREOF THAT SWITCHES A TOUCH PANEL BETWEEN AN INDEPENDENT MODE AND A DUAL INPUT MODE

CROSS-REFERENCE TO RELATED APPLICATION

This application claims the priority benefit of Taiwan application serial No. 107139901, filed on Nov. 9, 2018. The entirety of the above-mentioned patent application is hereby incorporated by reference herein and made a part of the specification.

BACKGROUND OF THE INVENTION

Field of the Invention

The invention relates to an electronic device, and in particular, to a control method of an electronic device.

Description of the Related Art

With the development of computer software and hardware, simultaneously processing different events rapidly or effectively switching between different input manners is important for a user.

Currently, touch input manners includes gesture input and command button input via user interface. And the command buttons are displayed on input interfaces, such as touch panels or touch screens. However, it is difficult to switch input modes between a gesture input mode and a command button input mode effectively and conveniently, thereby causing inconvenience in use.

BRIEF SUMMARY OF THE INVENTION

The disclosure provides a control method of an electronic device. The electronic device includes a touch panel. The touch panel provides a touch area and at least one command button, and includes an independent input mode and a dual input mode. The independent input mode is an input mode in which the command button and the touch area are independent; the dual input mode is an input mode in which the command button and the touch area are overlapped.

The control method of an electronic device includes the following steps: receiving touch data; determining whether the dual input mode needs to be executed or not, according to the touch data, executing the dual input mode when the dual input mode is determined to be executed, and executing the independent input mode when the dual input mode is not determined to be executed; and determining whether the touch panel is used within a preset time or not, after executing the dual input mode, considering the touch data as a gesture input when the touch panel is determined as being used within a preset time, and switching to the independent input mode when the touch panel is determined as not being used within a preset time.

The disclosure also provides an electronic device. The electronic device includes a touch panel, a touch executing module, a command executing module, and a mode determining module.

The touch panel provides a touch area and at least one command button, and is configured to have an independent input mode and a dual input mode. Where the independent input mode is configured to accept the input via the at least one command button on the touch panel, or, the input via the touch area on the touch panel individually; and the dual input mode accepts both the input via the command button and via the touch area. The touch executing module is configured to execute a gesture input via the touch area. The command executing module is configured to execute a control input via the at least one command button.

The mode determining module is configured to: receive touch data, and determine whether the dual input mode needs to be executed or not, according to the touch data, execute the dual input mode when the dual input mode is determined to be executed, and execute the independent input mode when the dual input mode is not determined to be executed; and determine whether the touch panel is used within a preset time or not, after executing the dual input mode, consider the touch data as a gesture input when the touch panel is determined as being used within a preset time, and switch to the independent input mode when the touch panel is determined as not being used within a preset time.

As described above, conventional computer touch input devices cannot switch between a gesture input mode and a command button input mode effectively and conveniently. In comparison, according to the control method of an electronic device provided in the disclosure, a corresponding input mode is determined according to input touch data, so that it switches between a gesture input operation and a control input operation for a user rapidly and intuitively, thereby improving usage convenience.

Specific embodiments used in the disclosure are further described with reference to the following embodiments and drawings.

DETAILED DESCRIPTION OF THE EMBODIMENTS

Specific embodiments of the disclosure are described in further detail with reference to the drawings. The advantages and features of the disclosure will be clearer according to the following description and the claims. It should be noted that, the drawings are all drawn in a simplified form and in an imprecise scale, and are merely used to help illustrate the embodiments of the disclosure conveniently and clearly.

Figure 1:
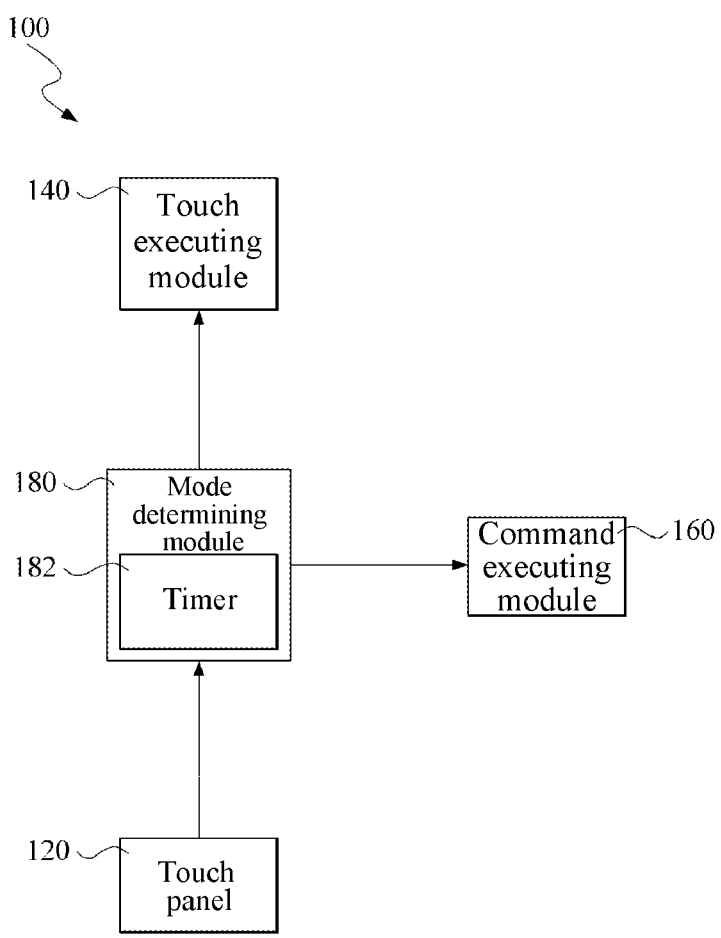
FIG. 1 is a schematic block diagram of an electronic device to which an embodiment of a control method of an electronic device according to the disclosure is applicable.
Figure 2:
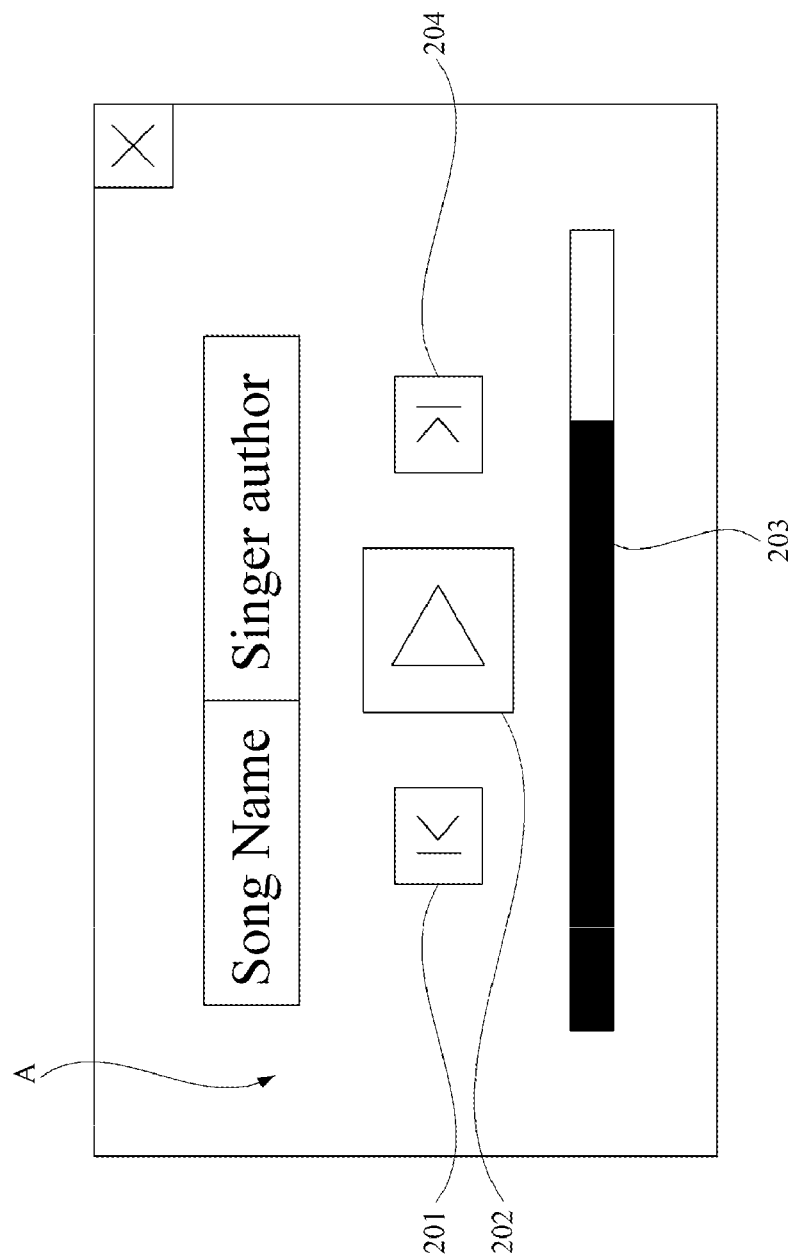
FIG. 2 is a schematic diagram of an embodiment of a display image presented by a touch panel in FIG. 1.

FIG. 1 is a schematic block diagram of an electronic device to which an embodiment of a control method of an electronic device according to the disclosure is applicable. FIG. 2 is a schematic diagram of an embodiment of an image presented by a touch panel in FIG. 1.

As shown in the figure, the electronic device 100 includes a touch panel 120, a touch executing module 140, a command executing module 160, and a mode determining module 180. The touch panel 120 provides a touch area A and at least one command button.

As shown in FIG. 2 of this embodiment, the touch area A includes a multimedia control interface providing a user to input gestures. A plurality of command buttons is defined in the multimedia control interface for the user to execute a control input via the command buttons. As shown in FIG. 2, in an embodiment, the multimedia control interface includes four command buttons, that is, a previous-song command button 201, a play command button 202, a volume command button 203, and a next-song command button 204. The user executes a corresponding operation by clicking the corresponding command buttons 201, 202, 203, or 204.

The touch executing module 140 executes a corresponding operation according to a gesture input in the touch area A. The command executing module 160 executes a corresponding operation according to an input via the command button 201, 202, 203, or 204. In an embodiment, the touch executing module 140 is an application program, and the command executing module 160 is an application program or plug in software.

Two touch input modes, that is, an independent input mode and a dual input mode, are predefined in the mode determining module 180. The independent input mode is an input mode in which the command button 201, 202, 203, or 204 and the touch area A are independent. In other words, in the independent input mode, a touch signal generated from a touch on the command button 201, 202, 203, or 204 is considered as a control input, and the command executing module 160 executes a corresponding function.

The dual input mode is an input mode in which the command button 201, 202, 203, or 204 and the touch area A are overlapped. In the dual input mode, a touch signal generated from a touch on the command button 201, 202, 203, or 204 is not directly considered as a control input; instead, the touch signal is considered as a gesture input when a particular condition is met, and the touch executing module 140 executes a corresponding function.

The mode determining module 180 receives touch data generated by the touch panel 120, and determines whether the dual input mode needs to be executed or not, according to the touch data. The touch data is data generated from a touch on the touch panel 120 with a finger of the user or a stylus, and generally includes data such as coordinates, a distance, a direction, and time.

In an embodiment, the mode determining module 180 determines whether the command button 201, 202, 203, or 204 exists in the area corresponding to the touch data. When the command button does not exist in the area corresponding to the touch data, the mode determining module 180 executes the independent input mode, considers the touch data as a gesture input, and instructs the touch executing module 140 to execute a corresponding operation. In this case, the dual input mode does not need to be executed.

When the command button 201, 202, 203, or 204 exists in the area corresponding to the touch data, the mode determining module 180 further determines whether the touch data meets a determining condition of the dual input mode. When the touch data meets the determining condition of the dual input mode, the mode determining module 180 executes the dual input mode. When the touch data does not meet the determining condition of the dual input mode, the mode determining module 180 considers the touch data as a control input, and instructs the command executing module 160 to execute a corresponding operation. In this case, the dual input mode is not executed.

In an embodiment, the determining condition of the dual input mode includes a distance parameter, such as 45 pixels. When the touch data does not meet the determining condition, such as when a fingertip movement distance corresponding to the touch data is less than the distance parameter, the mode determining module 180 considers the touch data as a control input. However, the disclosure is not limited thereto. In an embodiment, the determining condition includes a distance parameter and a direction parameter.

It should be noted that, depending on various properties, positions and operating manners of the command buttons have, the determining conditions of the command buttons are adjusted accordingly. Also, to improve the accuracy of each determining result, the same determining condition as above is not a requirement. In an embodiment, it is inappropriate to use the same determining condition for push-button command buttons, such as the previous-song control 201, the play control 202, and the next-song control 204, and slide-type command buttons, such as the volume command button 203. It is inappropriate to use the same determining condition for a command button at the bottom of the image and a command button at the center of the image.

After executing the dual input mode, the mode determining module 180 determines whether the touch panel 120 is used within a preset time or not. When the touch panel 120 is used within a preset time, the mode determining module detects a touch signal, the mode determining module 180 considers the touch data as a gesture input, and instructs the touch executing module 140 to execute a corresponding operation. When the touch panel 120 is not used within the preset time, that is, the mode determining module 180 detects no touch signal within the preset time, the mode determining module 180 switches a touch input mode from the dual input mode to the independent input mode. Touch data received before the mode switching is still considered as a gesture input.

In an embodiment, the mode determining module 180 includes a timer 182. The mode determining module 180 starts the timer 182 after detecting the touch signal. When it is detected within the preset time that the touch panel 120 is used, that is, a touch signal is detected, the mode determining module 180 resets the timer 182 immediately, to recalculate time. In this way, the mode determining module 180 is capable of determining whether the touch panel 120 is used within the preset time, so as to confirm whether it is necessary to switch to the independent input mode.

Figure 3:
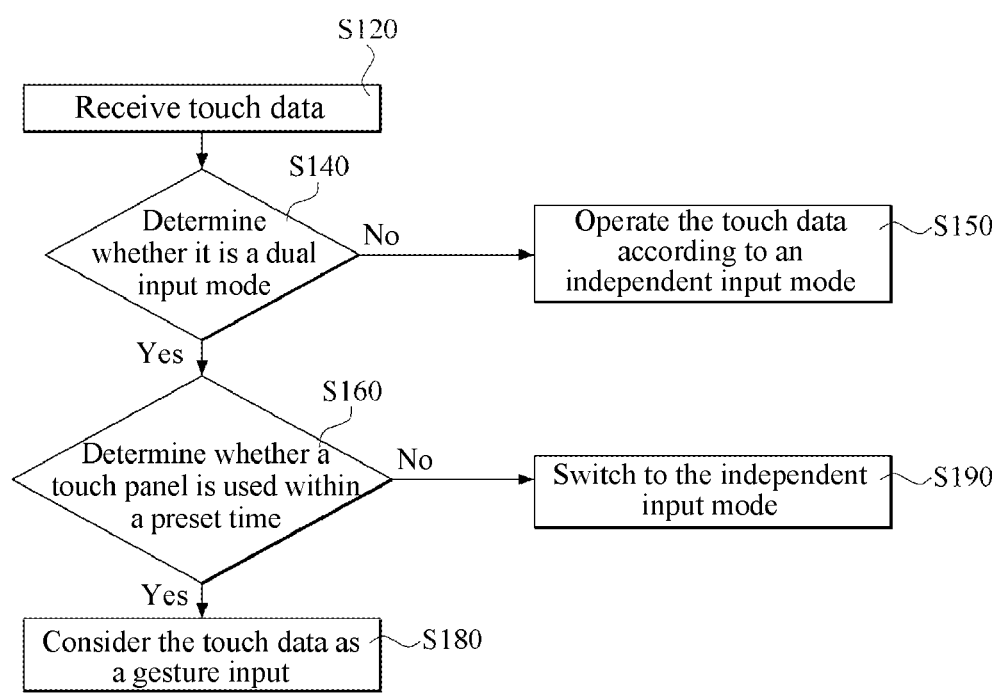
FIG. 3 is a flowchart of an embodiment of a control method of an electronic device according to the disclosure.

FIG. 3 is a flowchart of an embodiment of a control method of an electronic device according to the disclosure. The control method of an electronic device is applicable to the electronic device 100 in FIG. 1. That is, the electronic device includes a touch panel 120, so as to provide a touch area A and at least one command button. Moreover, the touch panel 120 includes an independent input mode and a dual input mode. The independent input mode is an input mode in which the command button and the touch area A are independent. The dual input mode is an input mode in which the command button and the touch area A are overlapped. In other words, in the independent input mode, a touch signal generated from a touch on the command button is considered as a control input, and the command executing module 160 executes a corresponding function. In the dual input mode, a touch signal generated from a touch on the command button is not directly considered as a control input; instead, the touch signal is considered as a gesture input when a particular condition is met, and the touch executing module 140 executes a corresponding function.

In an embodiment, the control method of an electronic device includes the following steps: In step S120, touch data from the touch panel 120 is received. The touch data is data generated from a touch on the touch panel 120 with a finger of the user or a stylus, and generally includes data such as coordinates, a distance, a direction, and time.

In step S140, it is determined whether the dual input mode needs to be executed or not, according to the received touch data. In an embodiment, in step S140, it is determined whether the dual input mode needs to be executed or not, according to whether a command button exists in a touch position corresponding to the touch data.

After it is determined in step S140 that the dual input mode needs to be executed, the dual input mode is executed immediately. Moreover, step S160 is performed to further determine whether the touch panel 120 is used within a preset time or not. When a determining result of step S140 is no, step S150 is performed to operate the touch data according to the independent input mode.

In step S180, when a determining result of step S160 is yes, that is, the touch panel 120 is used within the preset time, the touch data is considered as a gesture input, and a corresponding operation is performed.

In step S190, when the determining result of step S160 is no, that is, the touch panel 120 is not used within the preset time, a touch input mode is immediately switched from the dual input mode to the independent input mode.

Figure 4:
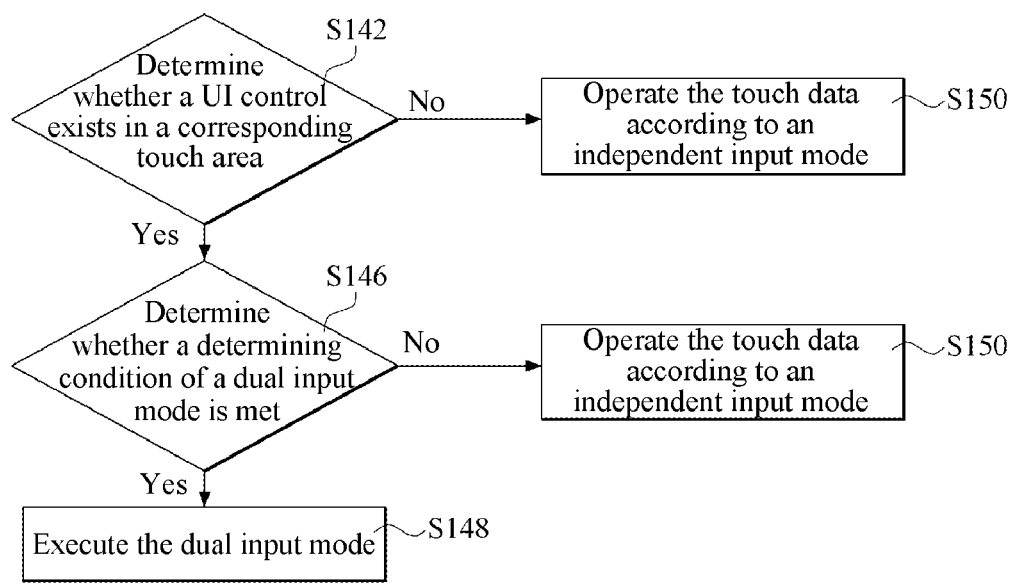
FIG. 4 is a flowchart of an embodiment of a detailed process of step S160 in FIG. 3.

FIG. 4 is a flowchart of a detailed process of step S140 in FIG. 3. As shown in FIG. 4, the step of determining whether the dual input mode needs to be executed or not, according to the touch data includes: step S142 of determining whether the command button exists in a touch position corresponding to the touch data. When a determining result of step S142 is no, that is, the command button does not exist in the touch position corresponding to the touch data, step S150 is performed to operate the touch data according to the independent input mode. That is, the touch data is considered as a gesture input, and a corresponding operation is performed.

When the determining result of step S142 is yes, that is, the command button exists in the touch position corresponding to the touch data, step S146 is performed to further determine whether the touch data meets a determining condition of the dual input mode. In an embodiment, the determining condition includes a distance parameter, such as 45 pixels. However, the disclosure is not limited thereto. In another embodiment, the determining condition includes a distance parameter and a direction parameter.

When a determining result of step S146 is yes, that is, the touch data meets the determining condition, the process proceeds to step S148, and the dual input mode is executed immediately.

When the determining result of step S146 is no, that is, the touch data does not meet the determining condition, the process proceeds to step S150, and the touch data is operated according to the independent input mode. That is, the touch data is considered as a control input, and a corresponding operation is performed.

Figure 5:
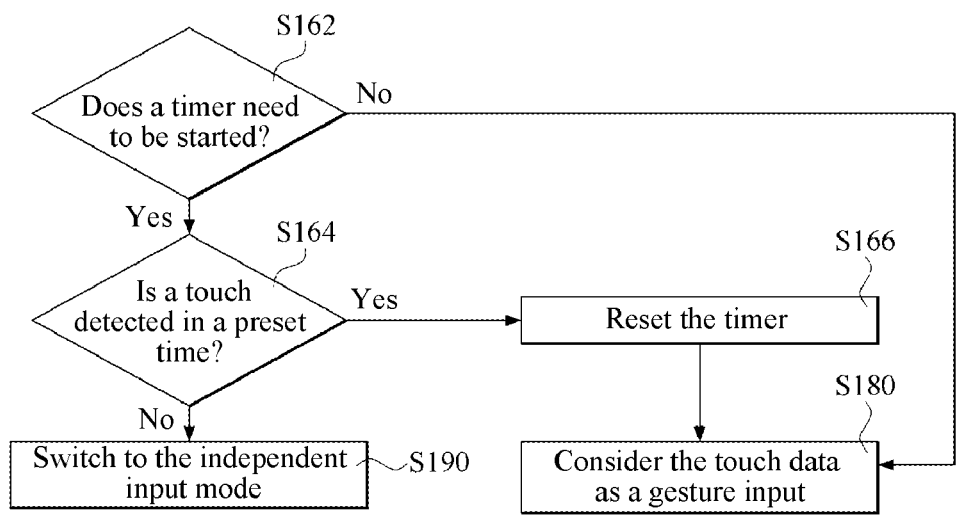
FIG. 5 is a flowchart of an embodiment of a detailed process of step S180 in FIG. 3.

FIG. 5 is a flowchart of an embodiment of a detailed process of step S160 in FIG. 3. As shown in FIG. 5, the step of determining whether the touch panel 120 is used within the preset time or not includes: as described in step S162, determining whether to start a timer, according to a usage status of the touch panel 120. In an embodiment, when it is detected that the touch panel 120 is used continuously, the timer is not started, and step S180 is executed since the touch data is considered as a gesture input, and a corresponding operation is thus performed. When it is detected that the touch panel 120 is not used, as described in step S164, the timer 182 is started immediately.

As described in step S166, when it is detected within the preset time that the touch panel 120 is used, a touch signal is detected, the timer is reset immediately, and step S180 is executed since the touch data is considered as a gesture input, and a corresponding operation is thus performed. When it is not detected that the touch panel 120 is used within the preset time, step S190 is performed to switch to the independent input mode.

As described in the embodiments above, according to the control method of an electronic device provided in the disclosure, a corresponding input mode is determined according to input touch data, so that a user switches between a gesture input operation and a control input operation rapidly and intuitively, thereby improving usage convenience.

Described above are merely preferred embodiments of the disclosure, which are not intended to limit the disclosure. Any form of equivalent replacement, modification, or other changes made on the technical means and technical content disclosed in the disclosure by any person skilled in the art without departing from the scope of the technical means of the disclosure are content that does not depart from the technical means of the disclosure, and still fall within the protection scope of the disclosure.

What is claimed is:

1. A control method of an electronic device, wherein the electronic device comprises a touch panel with a touch area and at least one command button preset thereon, the electronic device comprises an independent input mode and a dual input mode, the independent input mode is an input mode in which the command button and the touch area are independent; the dual input mode is an input mode in which the command button and the touch area are overlapped; and the control method of the electronic device comprises the following steps:

receiving touch data;

determining whether the dual input mode needs to be executed or not according to the touch data, executing the dual input mode when the dual input mode is determined to be executed, and executing the independent input mode when the dual input mode is not determined to be executed, wherein the step of determining whether the dual input mode needs to be executed or not according to the touch data comprises:

determining whether the command button exists in a touch position corresponding to the touch data; and executing the independent input mode when the command button does not exist in the touch position corresponding to the touch data; and determining whether the touch panel is used within a preset time or not after executing the dual input mode, considering the touch data as a gesture input when the touch panel is determined as being used within the preset time, and switching to the independent input mode when the touch panel is determined as not being used within the preset time.

2. The control method of an electronic device according to claim 1, wherein the step of determining whether the dual input mode needs to be executed or not according to the touch data further comprises:

determining whether the touch data meets a determining condition of the dual input mode when the command button exists in the touch position corresponding to the touch data; and executing the dual input mode when the touch data meets the determining condition of the dual input mode, and executing the independent input mode when the touch data does not meet the determining condition of the dual input mode.

3. The control method of an electronic device according to claim 1, wherein the step of determining whether the touch panel is used within the preset time or not comprises:
  determining whether a timer needs to be started, according to a usage status of the touch panel; and
  starting the timer when it is detected that the touch panel is not used, and resetting the timer when it is detected within the preset time that the touch panel is used.

4. The control method of an electronic device according to claim 2, wherein the determining condition comprises a distance parameter and a direction parameter.

5. The control method of an electronic device according to claim 2, wherein the touch panel presets a plurality of the command buttons, and each of the command buttons has a different determining condition.

6. An electronic device, comprising:
  a touch panel, configured to preset a touch area and at least one command button, and provide an independent input mode and a dual input mode, wherein the independent input mode is an input mode in which the command button and the touch area are independent, and the dual input mode is an input mode in which the command button and the touch area are overlapped;
  a touch executing application program, configured to execute a gesture input corresponding to the touch area;
  a command executing application program, configured to execute a control input corresponding to the at least one command button; and
  a mode determining application program, configured to:
    receive touch data, and determine whether the dual input mode needs to be executed or not, according to the touch data, determine whether the command button exists in a touch position corresponding to the touch data, and execute the independent input mode when the command button does not exist in the touch position corresponding to the touch data;
    execute the dual input mode when the dual input mode is determined to be executed, and execute the independent input mode when the dual input mode is not determined to be executed; and
    determine whether the touch panel is used within a preset time or not, after executing the dual input mode, consider the touch data as the gesture input when the touch panel is determined as being used within the preset time, and switch to the independent input mode when the touch panel is determined as not being used within the preset time.

7. The electronic device according to claim 6, wherein the mode determining application program is further configured to:
  determine whether the touch data meets a determining condition of the dual input mode when the command button exists in the touch position, execute the dual input mode when the touch data meets the determining condition of the dual input mode, and execute the independent input mode when the touch data does not meet the determining condition of the dual input mode.

8. The electronic device according to claim 6, wherein the mode determining application program comprises a timer, and the mode determining application program is configured to:
  after executing the dual input mode, determine whether the timer needs to be started, according to a usage status of the touch panel; and
  start the timer when it is detected that the touch panel is not used within the preset time; and
  reset the timer when it is detected that the touch panel is used within the preset time.

9. The electronic device according to claim 7, wherein the determining condition comprises a distance parameter and a direction parameter.

10. The electronic device according to claim 7, wherein the touch panel presets a plurality of the command buttons, and each of the command buttons has a different determining condition.

* * * * *